US006909213B2

(12) United States Patent
Frey et al.

(10) Patent No.: US 6,909,213 B2
(45) Date of Patent: Jun. 21, 2005

(54) ACTUATING DEVICE, PARTICULARLY FOR ACTUATING LOCKING DIFFERENTIALS ON VEHICLES

(75) Inventors: Ronald Frey, Bönnigheim (DE); Harald Schmidt, Zaberfeld (DE); Johannes Helmich, Wertheim (DE); Birgit Scheytt, Illingon (DE); Werner Baeskow, Hessigheim (DE)

(73) Assignee: Valeo Motoren und Aktuatoren GmbH (DE)

( * ) Notice: Subject to any disclaimer, the term of this patent is extended or adjusted under 35 U.S.C. 154(b) by 228 days.

(21) Appl. No.: 10/318,994

(22) Filed: Dec. 12, 2002

(65) Prior Publication Data

US 2003/0136618 A1 Jul. 24, 2003

(30) Foreign Application Priority Data

Dec. 12, 2001 (DE) .......................................... 101 60 847

(51) Int. Cl.[7] .............................................. H02K 49/00
(52) U.S. Cl. ............................................ 310/77; 310/93
(58) Field of Search ................................... 310/75 R, 76, 310/77, 79, 92, 93, 98; 188/156–162

(56) References Cited

U.S. PATENT DOCUMENTS

| | | | | |
|---|---|---|---|---|
| 2,628,321 A | * | 2/1953 | Anderson | 310/77 |
| 3,068,975 A | * | 12/1962 | Theuer | 192/223.3 |
| 4,585,967 A | * | 4/1986 | Mayer et al. | 310/217 |
| 5,854,522 A | * | 12/1998 | Iwata et al. | 310/89 |
| 5,867,892 A | * | 2/1999 | Beakes et al. | 29/732 |
| 5,872,412 A | * | 2/1999 | Mita et al. | 310/83 |
| 5,907,208 A | * | 5/1999 | Kristen et al. | 310/261 |
| 6,515,385 B2 | * | 2/2003 | Kuivamaki | 310/77 |

FOREIGN PATENT DOCUMENTS

| | | |
|---|---|---|
| DE | 2 203 516 | 1/1972 |
| DE | 39 10 888 | 10/1990 |
| DE | 40 34 277 | 5/1991 |
| DE | 200 14 614 | 11/2000 |

* cited by examiner

*Primary Examiner*—Dang Le
(74) *Attorney, Agent, or Firm*—Young & Basile, P.C.

(57) ABSTRACT

An actuating device, specifically to actuate locking differentials on vehicles, having an actuating shaft, a drive unit to drive the actuating shaft, where the drive unit comprises an armature core non-rotatably mounted on the actuating shaft and a commutator non-rotatably mounted on the actuating shaft, having an electromagnetic brake unit to brake and/or to hold the actuating shaft, where the brake unit includes a brake hub flange non-rotatably mounted on the armature, and having a single- or multi-piece housing tightly enclosing the drive unit and the brake unit, where the free end of the actuating shaft extends from the housing.

24 Claims, 4 Drawing Sheets

ACTUATING DEVICE, PARTICULARLY FOR ACTUATING LOCKING DIFFERENTIALS ON VEHICLES

The invention relates to an actuating device, particularly for actuating locking differentials on vehicles.

Actuating devices of this type find use particularly in a vehicle to assist the drive and brake systems. They normally comprise a drive unit to drive an actuating shaft and a braking unit to brake the actuating shaft. A locking differential can be engaged or disengaged by means of the actuating shaft. The drive unit assumes the actual shifting action. The brake unit keeps the actuating shaft in a predetermined position.

Severe demands are placed on actuating devices of this type. In particular, they must withstand operating temperatures up to 200° C. The actuating shaft can be subject to only relatively minor play in order to ensure functionally reliable actuation of the locking differential. In addition, the actuating shaft is supposed to be of simple construction and simple to install. The actuating shaft is also supposed to be of compact dimensions.

The object of the present invention is therefore to propose an actuating device which meets the stated requirements.

SUMMARY

To achieve this object, an actuating device is provided having an actuating shaft with a drive unit to drive the actuating shaft, where the drive unit has an armature core located non-rotationally on the actuating shaft and a commutator located non-rotationally on the actuating shaft, having an electromagnetic brake unit to slow and/or stop the actuating shaft, where the brake unit comprises a brake hub flange mounted non-rotationally on the armature shaft, and having a one-piece or multi-piece housing tightly enclosing the drive unit and the brake unit, where the open end of the actuating shaft extends out of the housing.

An actuating device of this type has the advantage that the drive unit and the brake unit lie spatially close to each other and are enclosed by a common, possibly multi-piece housing. The actuating device is consequently of very compact dimensions and is securely protected against environmental influences.

In a preferred aspect of the invention, the surface of the actuating shaft has splines running axially, which form a spline press fit with the inside of the brake hub flange. Joining by means of splines has the advantage that it creates a simple and positive connection in which the two parts of the joint do not have to be produced with too close and therefore expensive tolerances in diameter. In the spline press fit, the two parts of the joint are advantageously positively joined only in the area of the splines. As a result, the resulting insertion forces are considerably less in comparison to press fit joints made to close tolerances, acting over the entire circumference of the joined parts. In particular, thinner actuating shafts can be joined to the brake hub flange without the risk of undesirable distortion of the shaft. Even a minor distortion of the shaft results in tumbling and makes itself noticeable primarily as a distracting noise when the actuating device is operating.

When the shaft is joined to its mate, the splines advantageously embed themselves in the inside of the brake hub flange to form a positive and an interference fit. The inside of the brake hub flange does not need to satisfy any particular requirements for this to happen and otherwise needs no special machining.

It has proven to be advantageous if the height of the splines is in the range of about 0.02 mm. With splines of this type, an adequately good connection of the two parts of the joint is achieved with relatively low joining forces.

The brake hub flange is advantageously made of aluminum. By using such a soft material, the splines embed themselves advantageously into the aluminum, requiring relatively low insertion force. Since the shaft is of harder material than aluminum, no undesirable distortion of the shaft results when it is joined to the brake hub flange.

In a further, especially preferred aspect of the invention, each of the splines has a conical rise on at least one end. Providing a conical rise of this type has the advantage that when the two parts are joined, they are pre-centered because of the height of the splines, before maximum insertion force is brought to bear. The parts to be joined also cannot tilt, and the risk of scoring from any swarf pushed ahead of the parts being joined is avoided.

An advantageous aspect of the invention is created if the splines are located only in areas of the actuating shaft in which the brake hub flange is exposed to high radial forces. This has the advantage that the splines do not have to be formed over the entire length of the actuating shaft. Insertion forces are also reduced as a result.

The grooves can extend advantageously continuously and/or with interruptions over the entire length of the actuating shaft. The inside of the commutator and/or of the armature core facing the actuating shaft, together with the brake hub flange, also forms a spline press fit. The advantages resulting in conjunction with the brake hub flange apply equally to the spline press fit of the actuating shaft with the commutator and/or with the armature core.

Under the invention the actuating shaft can also be ground in sections, with the grinding taking place advantageously before the splines are formed. This has the advantage that ground areas can be provided, particularly for installing bearing elements. When the actuating shaft is joined to the other part, the ground areas are not affected, since the diameter of the shaft in the area of the splines is greater than in the area of the ground parts. Consequently, the bearing elements can be joined to the ground sections of the actuating shaft after the actuating shaft is joined to the brake hub flange, the commutator and/or the armature core. In order to produce an extremely precise spline diameter, it can be arranged under the invention that the actuating shaft is ground completely before being joined to the other part, or the other parts, respectively.

In a further aspect of the invention, the brake unit can be slipped onto the actuating shaft axially over the free end of the actuating shaft for assembly of the brake unit. While it is being slipped over the shaft, the splines bite into the flange of the brake unit. Assembly in this manner has the advantage that it can be performed blind.

It is further conceivable that the inside of the brake hub flange has a section tapering conically toward the actuating shaft. A section such as this on the brake hub flange contributes to the self-centering action of the two parts of the joint.

In a particularly preferred aspect of the invention, four splines disposed at 90° to each other are located around the actuating shaft. In addition to the axial press fit, this provides an adequate safeguard against the two parts of the joint rotating with respect to each other.

In order to ensure that the actuating shaft is guided accurately, even during the braking process through the brake unit, a preferred aspect of the invention has the actuating shaft supported against the housing by at least one bearing element in the area of the brake unit.

Advantageously the bearing section on the shaft side of the bearing element is located directly on the actuating shaft. This has the advantage that the power flow is taken directly from the actuating shaft over the bearing element into the housing.

As an alternative it is conceivable that the bearing section on the shaft side is located on the brake hub flange. This has the advantage that the brake hub flange along with the bearing element can be pre-assembled and handled as an independent assembly. The brake hub flange along with the bearing element is then joined as one to the actuating shaft over the brake hub flange.

In an further aspect of the invention, the brake unit has a braking body secured against rotation against the housing and incorporating a brake winding and a brake rotor carrier with a brake rotor connected non-rotationally to the actuating shaft, where, when current is applied to the brake winding, the brake rotor is attracted to the brake body or repelled from the brake body. As a result, a brake unit is realized with a small number of components which meets the requirements for the actuating device. The brake rotor is preferably configured as a brake rotor ring, where in its assembled state, the actuating shaft passes through the central opening of the brake rotor ring.

Advantageously the brake body is configured as a magnetic brake body. This has the advantage that no additional permanent magnets need to be provided that achieve suitable braking action in conjunction with the brake winding.

In a particularly preferred aspect of the invention, the brake rotor can be moved axially with respect to the brake rotor carrier, where a spring element is positioned between the brake rotor and the brake rotor carrier which presses the brake rotor toward or away from the brake body. This has the advantage that the brake rotor, both with the brake unit activated and not activated, is in a specified position. This suppresses clattering noises when the actuating device is in operation.

The brake rotor carrier can be located directly or by means of a brake rotor hub on the actuating shaft. The brake rotor carrier or the brake rotor hub is configured as a separate component or in one piece with the brake hub flange. The single-piece configuration with the brake hub flange has the advantage that additional components are not necessary. Positional tolerances can be kept smaller as a result.

An additional aspect of the invention is characterized in that the brake body is attached on the brake hub flange, where a bearing, specifically a friction bearing, is located between the brake body and the brake hub flange. This has the advantage that the brake body with the brake hub flange can be configured as an independent component assembly which can be handled separately.

On the other hand, it is also conceivable under the invention that the brake body is attached on the housing side. In an aspect of the invention of this type in the assembled state, an air gap exists between the brake body and the brake hub flange or the actuating shaft. This has the advantage that a bearing element, specifically a friction bearing, does not have to be provided between the brake body and the brake hub flange or the actuating shaft.

To realize non-rotation of the brake body against the housing, the brake body can be clinched against the housing in sections. It is further conceivable that the brake body has defined elevations, for example in the form of pins, that engage corresponding recesses, blind holes in the case of pins.

Advantageously the housing has a pot-shaped housing base and a housing cover with an opening for the actuating shaft. The drive unit can be located in the area of the housing base and the brake unit in the area of the housing cover.

BRIEF DESCRIPTION OF THE DRAWING

Additional advantageous aspects and details of the invention can be found in the description to follow, in which the invention is described in greater detail and explained on the basis of the aspects shown in the drawing.

DETAILED DESCRIPTION

Figure 1:
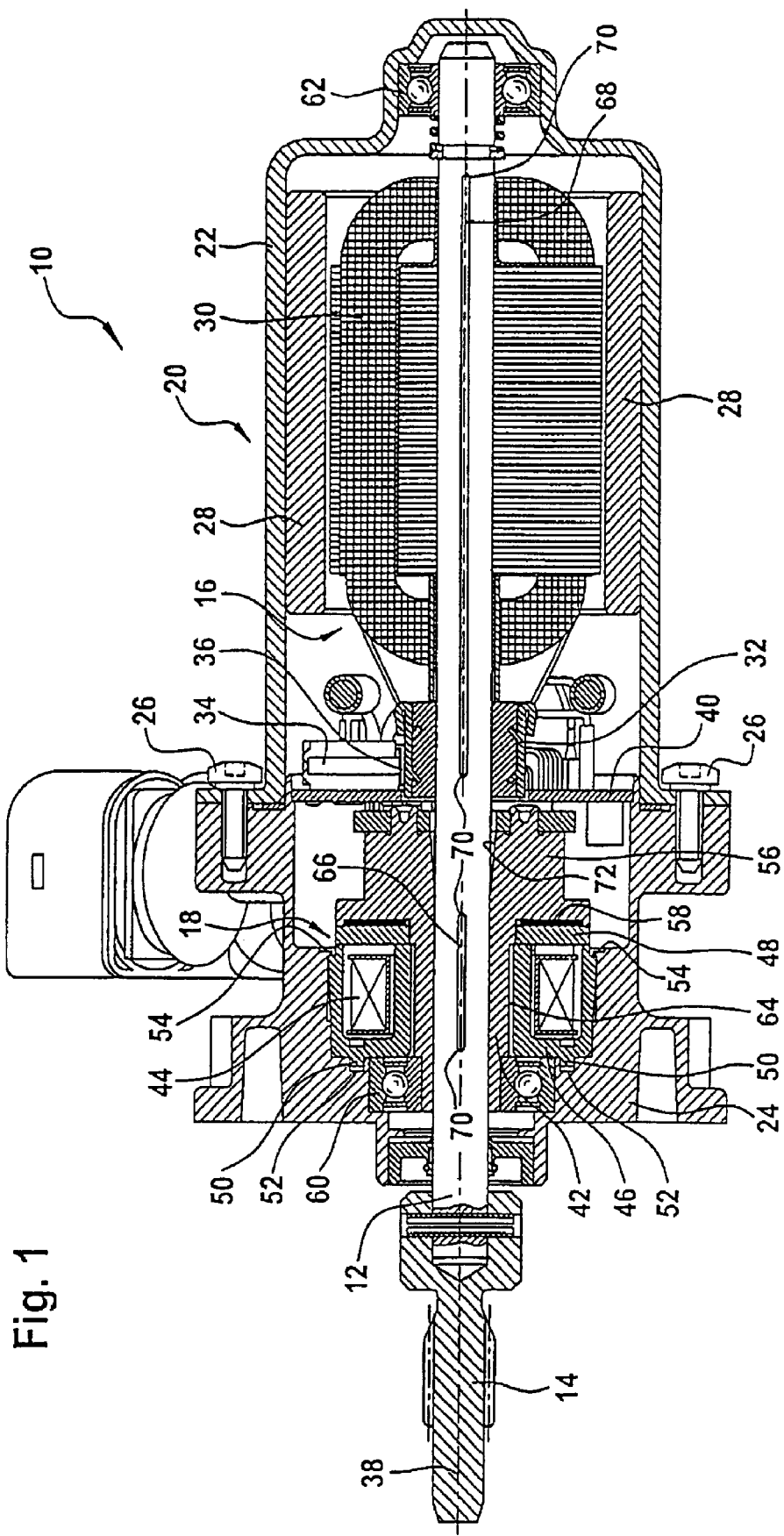
FIG. 1 shows a longitudinal section through a first actuating device under the invention.

A first aspect of an actuating device 10 under the invention is shown in FIG. 1. On the free end of an actuating shaft 12 the actuating device 10 has a pinion 14 through which a locking differential (not shown) of a vehicle can be actuated. The actuating device comprises a drive unit 16 and an electromagnetic brake unit 18, where the drive unit 16 and the brake unit 18 are accommodated in a common housing 20. The housing 20 comprises a pot-shaped housing base 22 which locates the drive unit 16. Further the housing 20 comprises a housing cover 24 in which the brake unit 18 is accommodated. The housing cover 24 can be tightly bolted to the housing base 20 with fasteners 26.

The drive unit 16 includes permanent magnets 28 on the housing side that interact with an armature core 30 located non-rotationally on the actuating shaft 12. The drive unit 16 further includes a commutator 32 located non-rotationally on the actuating shaft 12, with brushes 36 mounted in brush holders 34 acting against the outer surface of the commutator 32. The brush holders 34 are attached on a brush rocker 40 positioned perpendicular to the longitudinal axis 38 of the actuating shaft 12. Various additional electrical components, for example, interference suppression devices, are furnished on the brush rocker 40.

The brake unit 18 comprises a brake hub flange 42 located on the actuating shaft 12 and prevented from rotating, and a brake body 46 which is prevented from rotating against the housing cover 24 and which includes a brake winding 44. The brake unit 18 further includes a brake rotor 48, configured as a brake rotor ring, which is prevented from rotating with respect to the actuating shaft 12 but which has limited axial movement. When current is applied to the brake winding 44, the brake rotor 48 acts against the brake body 46, which is likewise of annular shape. When current is applied to the brake winding 46, the braking effect results, and the actuating shaft 12 is prevented from rotating against the housing 20, or the housing cover 24, through the brake hub flange 42, the brake rotor 48 and the brake body 46. To provide an arrangement whereby the brake body 46 does not rotate in the housing cover 24, the brake body 46 is furnished with pins 50 running coaxially to the longitudinal axis 38. The pins 50 protrude into correspondingly-shaped blind holes 52 in the housing cover 24. To mount the brake body 46 securely inside the housing cover 24, sections 54 are provided on the housing cover 24 which are staked into matching sections on the outer surface of the brake body 46.

To ensure a specified position of the brake rotor 48 when the brake unit 18 is not actuated, a spring element 58 is furnished between the brake rotor 48 and a section of the brake rotor carrier 56 of the brake hub flange 42, which presses the brake rotor 48 against the section of the brake rotor carrier 56.

Two bearing elements 60 and 62 are provided to carry the actuating shaft 12.

In the case of the actuating device 10 from FIG. 1, the shaft-side bearing section of the bearing element 60 is located on the brake hub flange 42. This has the advantage that simple assembly of the actuating device 10 is possible, since the entire braking unit 18 with the bearing element 60 can be pressed, or inserted, into the housing cover 24. The entire brake unit 18 with bearing element 62 can consequently be pre-assembled and handled separately as a cohesive assembly. An air gap 64 is provided between the interior outer surface of the brake body 46 and the side of the brake hub flange 42 facing this outer surface. As a result, bearing elements or bearing means between the brake body 46 and the brake hub flange 42 are not necessary.

In the section from FIG. 1, two grooves, or splines, 66 and 68 are furnished on the actuating shaft 12 along one line. Spline 66 is in the area of the brake hub flange, and spline 68 is in the area of the drive unit 16.

Figure 4:
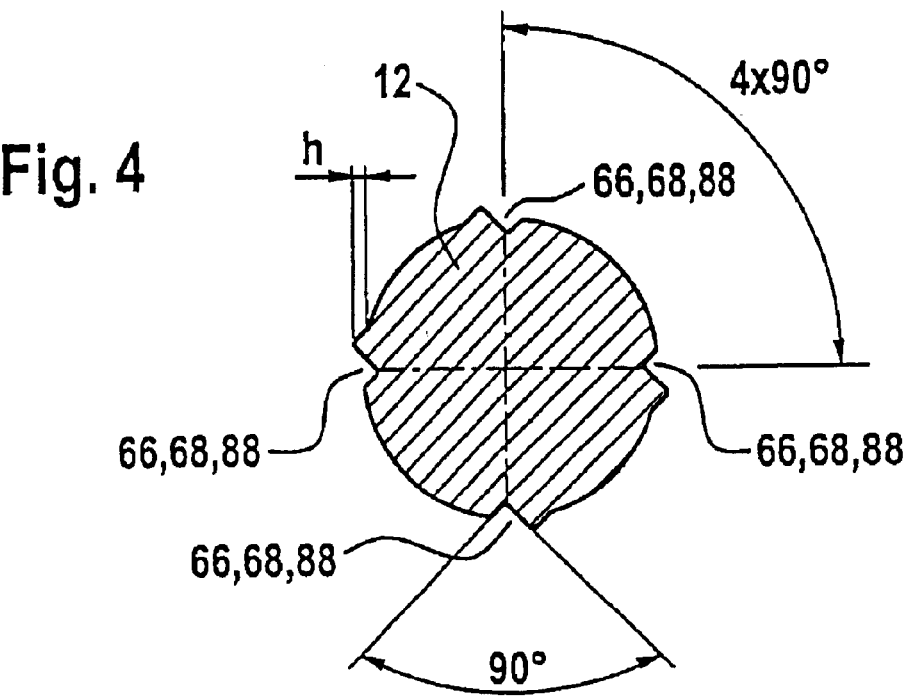
FIG. 4 shows a cross section through an actuating shaft of an actuating device under the invention.

As can be seen from the cross-section from FIG. 4, the actuating shaft 12 has a total of four splines 66 and four splines 68 each. The splines 66, 68 are offset to each other at an angle of 90°. The splines as such have a notch angle in each case of 90°. The height h of the splines is in the region of about 2/100 mm. The actuating shaft 12 has no splines in the area of the bearing elements 60 and 62. These areas can be ground to achieve a high degree of accuracy. The splines 66, 68 can be created in the actuating shaft following the grinding procedure.

Figure 5:
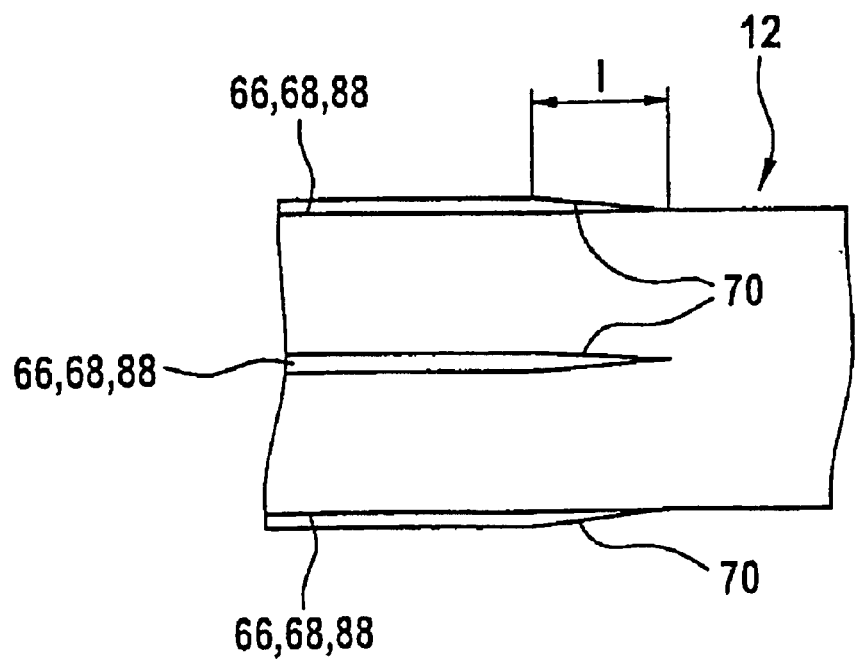
FIG. 5 a side view of an actuating shaft of an actuating device under the invention.

As can be seen from FIG. 5, the splines 66, 68 have conical sections 70 at their respective ends which extend over length 1 in an axial direction.

To assemble the actuating shaft 12 to the brake hub flange 42, the end of the actuating shaft having the pinion 14 is inserted into the central opening of the brake hub flange 42 without the pinion. The inside of the brake hub flange 42 has a conical section 72 tapering toward the actuating shaft 12. Because of the conical sections 70 and the conical section 72, the result is a self-centering action when the brake hub flange 42 is joined to the actuating shaft 12. When they are joined, the peaks of the spline 66, 68 embed themselves into the inside of the brake hub flange 42, which is preferably made of aluminum. The result is a spline press fit between the brake hub flange 42 and the actuating shaft 12, which can be achieved with relatively low insertion force.

In the assembled state, the grooves 68 interact with the armature core 30 and with the commutator 32, as shown in FIG. 1. Because of the conical sections 70 of the grooves 68, there is a self-centering action here as well when they are joined. Since the positive interference fit between the actuating shaft 12 and the commutator 32 or the armature core 30 advantageously takes place only at the peaks of the splines 68, the insertion force can be kept relatively low. The ground section of the actuating shaft 12, which interacts with the bearing element 62 in its installed position, is not damaged when the actuating shaft 12 is joined to the commutator 32 and the armature core 30.

Figure 2:
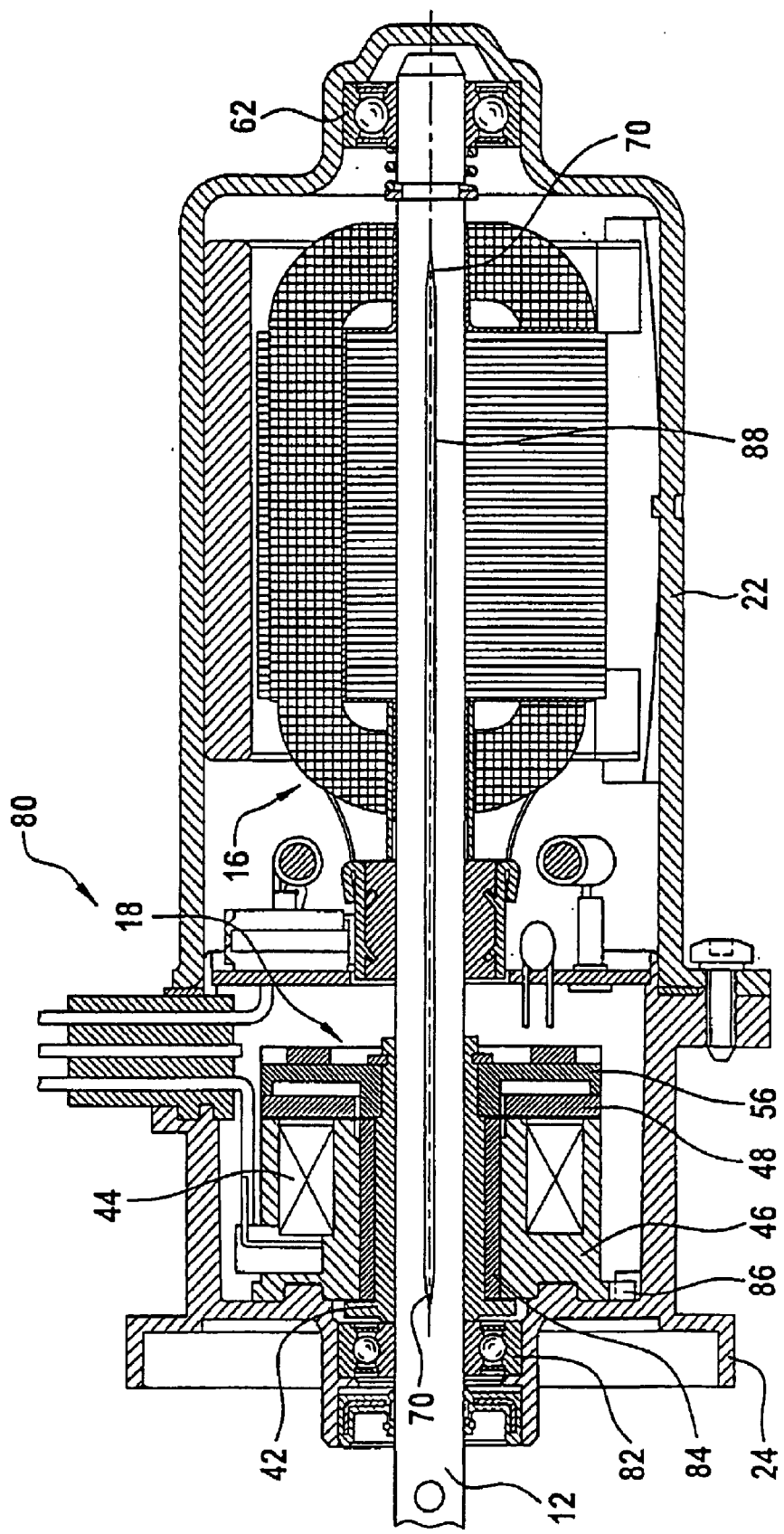
FIG. 2 shows a longitudinal section through a second actuating device under the invention.
Figure 3:
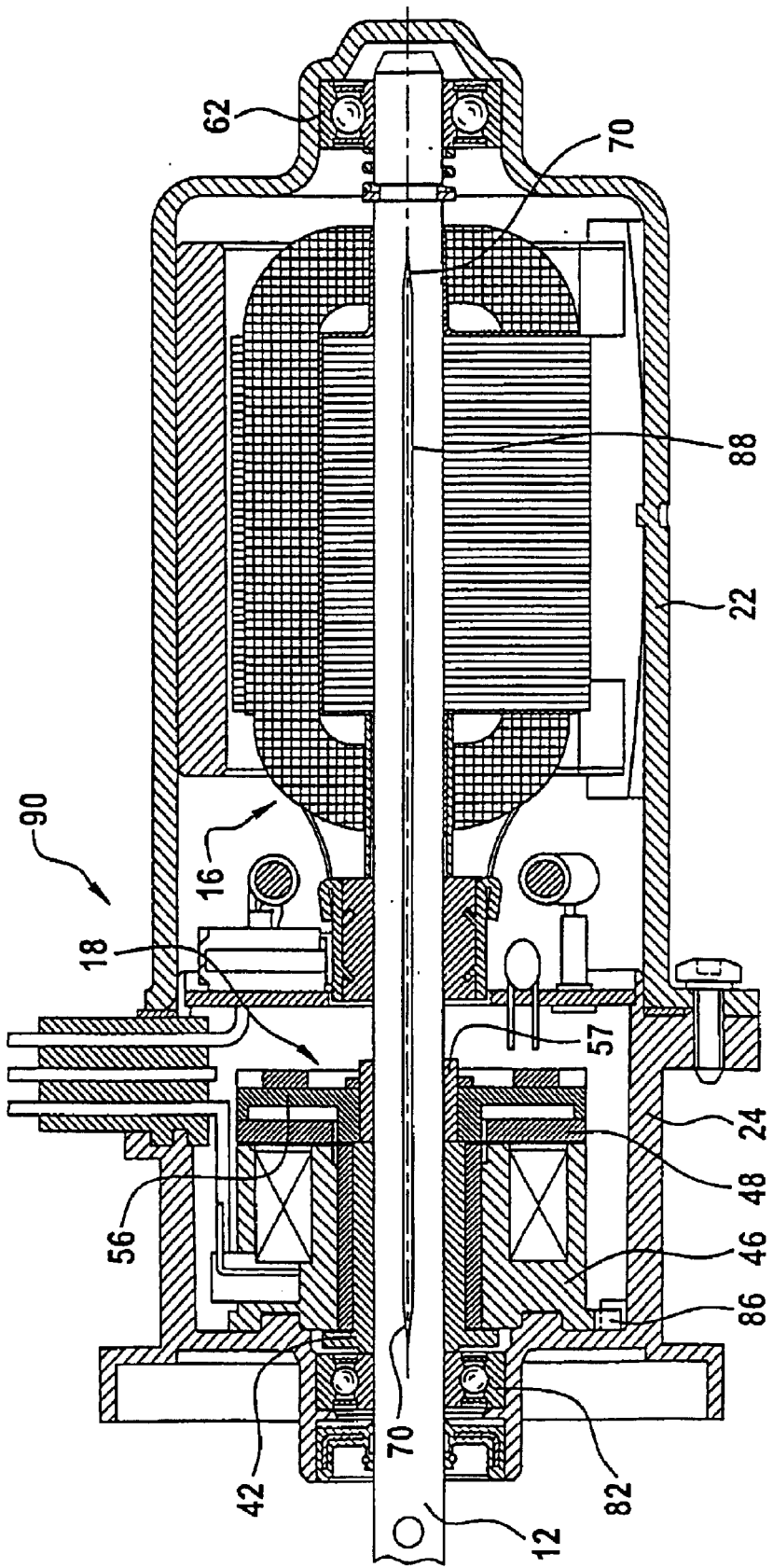
FIG. 3 shows a longitudinal section through a third actuating device under the invention.

A second actuating device 80 under the invention is shown in FIG. 2, and in FIG. 3 a third actuating device 90 under the invention. The components corresponding to the actuating device 10 are given the same reference numbers in the actuating devices 80 and 90.

One way in which actuating device 80 differs from actuating device 10 is that the brake unit-side bearing element 82 has a bearing section located directly on the actuating shaft 12. Further, the brake body 46 is not located on the housing cover side, but is located by means of a friction bearing 84 on the brake hub flange 42. To ensure that the brake body 46 cannot rotate, a lug 86 is provided, which engages teeth located the housing cover side, as shown in FIG. 2.

The aspect from FIG. 2 has the advantage that the air gap to be provided between the brake body 46 and the brake rotor 48 can be set in the assembly containing the brake body 46 and the brake rotor 48.

A further difference between the actuating device 10 from FIG. 1 and the actuating device 80 from FIG. 2 is that, in the case of actuating device 80, there are not two splines 66 and 68 positioned along one line. Instead, splines 88 are provided which extend over the drive unit 16 and the brake unit 18. The shape of the splines 88 is as shown in FIGS. 4 and 5. They are simpler to manufacture because no breaks in the grooves 88 are planned.

In the case of the actuating device 90 from FIG. 3, the bearing element 82 is located lying directly against the actuating shaft 12, as is the case with the actuating device 80 from FIG. 2. Actuating device 90 differs from actuating device 80 in that the brake rotor carrier 56 is formed separately from the brake hub flange 42 as an independent component. The brake rotor carrier 56 is positioned on the actuating shaft 12 by means of a brake rotor hub 57. In this embodiment, the air gap between the brake rotor 48 and the brake body 46 can still be advantageously set during assembly of the brake hub flange 42, or of the section of the brake rotor carrier 56.

All the features shown in the description, the claims to follow and the drawing can be fundamental to the invention both individually and in any combination.

What is claimed is:

1. An actuating device, specifically to actuate locking differentials on vehicles, comprising:
    an actuating shaft;
    a drive out to drive the actuating shaft, where the drive unit comprises an armature core located non-rotationally on the actuating shaft and a commutator located non-rotationally on the actuating shaft;
    an electromagnetic brake unit for braking and/or holding the actuating shaft, where the brake unit comprises a brake hub flange located non-rotationally on the actuating shaft and a brake winding wound around at least a portion of the brake hub flange; and
    a housing configured in at least one piece which tightly encloses the brake unit, where the free end of the actuating shaft extends out of the housing.

2. The actuating device from claim 1, wherein the surface of the actuating shaft has splines running axially which form a spline press fit with the inside of the brake hub flange.

3. The actuating device from claim 2, wherein the splines are embedded in the inside of the brake hub flange.

4. The actuating device from claim 2, wherein the height of the splines is about 0.02 mm.

5. The actuating device from claim 2, wherein the brake hub flange is made of aluminum.

6. The actuating device from claim 2, wherein the spline has a conical rise on at least one end.

7. The actuating device from claim 2, wherein the splines are located in areas of the actuating shaft in which the brake hub flange is exposed to severe radially acting forces.

8. The actuating device from claim 2, wherein the splines extend continuously over the length of the actuating shaft, where the inside of the commutator facing one of the inside of the actuating shaft and the inside of the armature core forms a spline press fit with the actuating shaft.

9. The actuating device from claim 2, wherein the actuating shaft is ground in sections, where the grinding is carried out specifically before the splines are cut.

10. The actuating device from claim 2, wherein for assembly of the brake unit, the brake unit can be passed axially over the free end of the actuating shaft onto the actuating shaft.

11. The actuating device from claim 2, wherein the inside of the brake hub flange has a section running conically toward the actuating shaft.

12. The actuating device from claim 2, wherein four splines are provided, offset 90° to each other.

13. The actuating device from claim 1, wherein the actuating shaft is supported against the housing in the area of the brake unit by at least one bearing element.

14. The actuating device from claim 13, wherein the section of the bearing element on the shaft side is located directly on the actuating shaft.

15. The actuating device from claim 13, wherein the brake rotor carrier is mounted one of directly and by means of a brake rotor hub on the actuating shaft.

16. The actuating device from claim 13, wherein the brake rotor carrier or the brake rotor hub is configured in one piece with the brake hub flange.

17. The actuating device from claim 13, wherein the brake body is attached on the side of the brake hub flange, where a bearing, specifically a friction bearing, is located between the brake body and the brake hub flange.

18. The actuating device from claim 13, wherein the brake body is attached on the housing side.

19. The actuating device from claim 1, wherein the housing has a pot-shaped housing base and a housing cover with an opening for the actuating shaft.

20. The actuating device from claim 19, wherein the drive unit is located in the area of the housing base and the brake unit is located in the area of the housing cover.

21. An actuating device, specifically to actuate locking differentials on vehicles, comprising:

an actuating shaft;

a drive unit to drive the actuating shaft, where the drive unit comprises an armature core located non-rotationally on the actuating shaft and a commutator located non-rotationally on the actuating shaft;

an electromagnetic brake unit for braking and/or holding the actuating shaft, where the brake unit comprises a brake hub flange located non-rotationally on the actuating shaft; and a housing configured in at least one piece which tightly encloses the brake unit, where the free end of the actuating shaft extends out of the housing; and wherein the actuating shaft is supported against the housing in the area of the brake unit by at least one bearing element; and wherein the section of the bearing element on the shaft side is located directly on the brake hub flange.

22. An actuating device, specifically to actuate locking differentials on vehicles, comprising:

an actuating shaft;

a drive unit to drive the actuating shaft, where the drive unit comprises an armature core located non-rotationally on the actuating shaft and a commutator located non-rotationally on the actuating shaft;

an electromagnetic brake unit for braking and/or holding the actuating shaft, where the brake unit comprises a brake hub flange located non-rotationally on the actuating shaft; and a housing configured in at least one piece which tightly encloses the brake unit, where the free end of the actuating shaft extends out of the housing; and wherein the brake unit has a brake body secured from rotation against the housing comprising a brake winding and a brake rotor carrier with a brake rotor, non-rotatably attached to the actuating shaft where, when the brake winding has current applied, the brake rotor is pulled against the brake body or repelled by the brake body.

23. The actuating device from claim 22, wherein the brake body is a magnetic brake body.

24. The actuating device from claim 22, wherein the brake rotor can be moved axially relative to the brake rotor carrier, where a spring element is located between the brake rotor and the brake rotor carrier, which presses the brake rotor in the direction away from the brake body.

* * * * *